United States Patent
Parker et al.

(10) Patent No.: US 9,812,131 B2
(45) Date of Patent: Nov. 7, 2017

(54) IDENTIFYING AND DISPLAYING CALL PARTICIPANTS USING VOICE SAMPLE

(71) Applicant: Lenovo Enterprise Solutions (Singapore) Pte. Ltd., Singapore (SG)

(72) Inventors: Emil Paul Parker, Youngsville, NC (US); Jonathan Keener Grice, Raleigh, NC (US); John Thomas McAlpin, Raleigh, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 14/936,497

(22) Filed: Nov. 9, 2015

(65) Prior Publication Data

US 2017/0133018 A1    May 11, 2017

(51) Int. Cl.
| | | |
|---|---|---|
| *G10L 17/00* | (2013.01) | |
| *G10L 17/08* | (2013.01) | |
| *G10L 17/04* | (2013.01) | |
| *G10L 25/72* | (2013.01) | |
| *H04M 3/56* | (2006.01) | |

(52) U.S. Cl.
CPC ............. *G10L 17/08* (2013.01); *G10L 17/04* (2013.01); *G10L 25/72* (2013.01); *H04M 3/568* (2013.01)

(58) Field of Classification Search
CPC ......... G10L 17/00; G10L 17/02; G10L 17/04; G10L 17/06; G10L 17/20; G10L 17/22; G10L 17/24

USPC ................. 704/250, 246, 273, 270
See application file for complete search history.

(56) References Cited

U.S. PATENT DOCUMENTS

| | | | |
|---|---|---|---|
| 6,853,716 B1* | 2/2005 | Shaffer | H04M 3/56 370/260 |
| 8,416,261 B1* | 4/2013 | Lawson | G04G 9/0076 345/619 |
| 2002/0034280 A1* | 3/2002 | Infosino | H04M 3/42229 379/88.02 |
| 2003/0228007 A1* | 12/2003 | Kurosaki | H04M 3/51 379/142.06 |
| 2011/0110502 A1* | 5/2011 | Daye | H04M 3/4936 379/88.04 |
| 2015/0304801 A1 | 10/2015 | Gundam et al. | |

* cited by examiner

*Primary Examiner* — Qi Han
(74) *Attorney, Agent, or Firm* — Zilka-Kotab, P.C.

(57) ABSTRACT

A computer program product, according to one embodiment, includes a computer readable storage medium having program instructions embodied therewith, the program instructions readable and/or executable by a computer to cause the computer to: receive one or more voice signals from one or more participants of a call, correlate each of the one or more received voice signals with speaker profiles in a database, output speaker identification information from the correlated speaker profiles, and send the speaker identification information at least one of the participants of the call. Other systems, methods, and computer program products are described in additional embodiments.

17 Claims, 4 Drawing Sheets

IDENTIFYING AND DISPLAYING CALL PARTICIPANTS USING VOICE SAMPLE

FIELD OF THE INVENTION

The present invention relates to voice recognition, and more particularly, this invention relates to person-specific voice recognition.

BACKGROUND

Being able to identify who is included on a phone call is a desirable way of determining information pertaining to those individuals participating in the call. For example, caller identification (ID) allows a person receiving a phone call to determine who they will be in communication with if the call is answered. However, as the number of individuals participating on a given phone call increases, it becomes harder to identify and distinguish between call participants. For example, existing products are unable to identify who is speaking or even included on a teleconference for a meeting, seminar, etc. having multiple participants. This is particularly apparent when more than one teleconference participant is located at a given location, e.g., using the same teleconference interface.

Existing solutions to such shortcomings require call participants to ask for the identification of other call participants and their personal information for context. However, this is inefficient as it requires time that would otherwise be spent conducting the teleconference and interrupts the flow of discussion.

Similar issues are apparent for call locations, such as phone service centers, which receive calls from various different people. Again, the existing solution is for the representative at the call location to ask for some kind of personal information which can assist the representative in looking up additional information which uniquely identifies the caller. However, the time required to request, receive and look-up the information can require a substantial amount of time which results in inefficiencies.

Previous attempts to overcome these issues used audio level outputs to determine which microphone connected to a call corresponds to the voice currently being heard. However, such attempts are still unable to distinguish between different people using the same interface. Accordingly, call participants must still revert to asking for the identification of other call participants and their personal information for context.

SUMMARY

A computer program product, according to one embodiment, includes a computer readable storage medium having program instructions embodied therewith, the program instructions readable and/or executable by a computer to cause the computer to: receive one or more voice signals from one or more participants of a call, correlate each of the one or more received voice signals with speaker profiles in a database, output speaker identification information from the correlated speaker profiles, and send the speaker identification information to at least one of the participants of the call.

A computer program product, according to another embodiment, includes a computer readable storage medium having program instructions embodied therewith, the program instructions readable and/or executable by a computer to cause the computer to: receive voice signals from participants of a call, select a subset of speaker profiles in a database for each of the two or more received voice signals, correlate each of the two or more received voice signals with the selected subset of speaker profiles in the database, output speaker identification information from the correlated speaker profiles, and send, by the computer, the speaker identification information to participants of the call located at two or more physical locations.

A method, according to yet another embodiment, includes: collecting one or more voice samples from one or more potential speakers, using the one or more voice samples to create a speaker profile for each of the one or more potential speakers in a database, sending a request for potential speaker identification information to each of the potential speakers, receiving potential speaker identification information from the potential speakers, and populating the speaker profiles with the corresponding potential speaker identification information.

Other aspects and advantages of the present invention will become apparent from the following detailed description, which, when taken in conjunction with the drawings, illustrate by way of example the principles of the invention.

DETAILED DESCRIPTION

Figure 1:
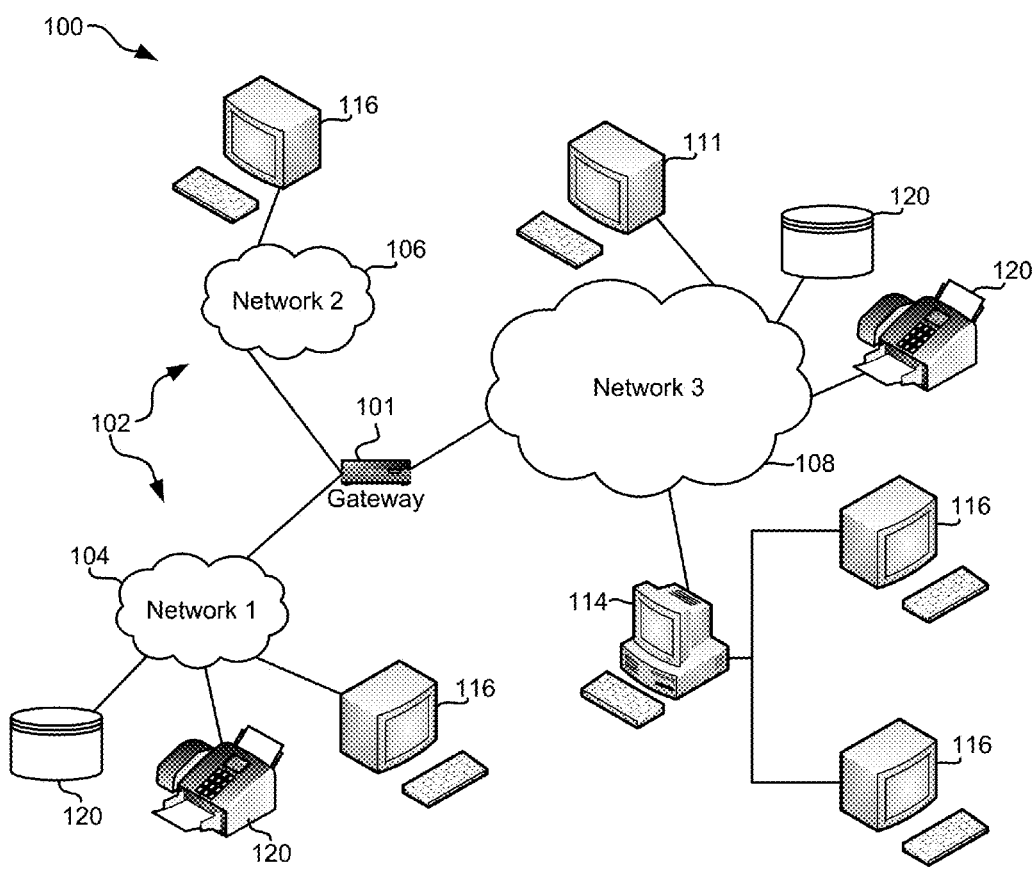
FIG. 1 is a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of voice recognition and/or related systems and methods whereby a speaker is identified from the speaker's voice. It should be appreciated that various embodiments herein can be implemented with a wide range of voice transmission applications, including for example, teleconferences or group telephone calls connecting one or more locations using sound. To provide a context, and solely to assist the reader, various embodiments may be described with reference to a type of voice transmission application. This has been done by way of example only, and should not be deemed limiting on the invention defined in the claims. For example, any of the approaches described herein may be implemented for analyzing the audio feed from a video conference as would be appreciated by one skilled in the art upon reading the present description.

In one general embodiment, a computer program product includes a computer readable storage medium having program instructions embodied therewith, the program instructions readable and/or executable by a computer to cause the computer to: receive, by the computer, one or more voice signals, correlate, by the computer, each of the one or more received voice signals with speaker profiles in a database, output, by the computer, speaker identification information from the correlated speaker profiles, and send, by the computer, the speaker identification information to a device located at one or more physical locations.

In another general embodiment, a computer program product includes a computer readable storage medium having program instructions embodied therewith, the program instructions readable and/or executable by a computer to cause the computer to: receive, by the computer, two or more voice signals, select, by the computer, a subset of speaker profiles in a database for each of the two or more received voice signals, correlate, by the computer, each of the two or more received voice signals with the selected subset of speaker profiles in the database, output, by the computer, speaker identification information from the correlated speaker profiles, and send, by the computer, the speaker identification information to devices located at two or more physical locations.

In yet another general embodiment, a method includes: collecting one or more voice samples from one or more potential speakers, using the one or more voice samples to create a speaker profile for each of the one or more potential speakers in a database, sending a request for potential speaker identification information to each of the potential speakers, receiving potential speaker identification information from the potential speakers, and populating the speaker profiles with the corresponding potential speaker identification information.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In one illustrative approach, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a computer readable storage or signal medium having computer code thereon, which may be executed by a computing device (e.g., a processor) and/or system. A computer readable storage medium can include any medium capable of storing computer code thereon for use by a computing device or system, including optical media such as read only and writeable CD and DVD, magnetic memory or medium (e.g., hard disk drive, tape), semiconductor memory (e.g., FLASH memory and other portable memory cards, etc.), firmware encoded in a chip, etc.

A computer readable signal medium is one that does not fit within the aforementioned storage medium class. For example, illustrative computer readable signal media communicate or otherwise transfer transitory signals within a system, between systems e.g., via a physical or virtual network, etc.

FIG. 1 illustrates an architecture 100, in accordance with one embodiment. As an option, the present architecture 100 may be implemented in conjunction with features from any other embodiment listed herein, such as those described with reference to the other FIGS. Of course, however, such architecture 100 and others presented herein may be used in various applications and/or in permutations which may or may not be specifically described in the illustrative embodiments listed herein. Further, the architecture 100 presented herein may be used in any desired environment.

As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, hand-held computer, printer or any other type of logic. It should be noted that a user device 111 may also be directly coupled to any of the networks, in one embodiment.

A peripheral 120 or series of peripherals 120, e.g. facsimile machines, printers, networked storage units, etc., may be coupled to one or more of the networks 104, 106, 108. It should be noted that databases, servers, and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates a MAC OS environment, a UNIX system which virtually hosts a MICROSOFT WINDOWS environment, a MICROSOFT WINDOWS system which emulates a MAC OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data processing and/or storage, servers, etc., are provided to any system in the cloud, preferably in an on-demand relationship, thereby allowing access and distribution of services across many computing systems. Cloud computing typically involves an Internet or other high speed connection (e.g., 4G LTE, fiber optic, etc.) between the systems operating in the cloud, but other techniques of connecting the systems may also be used.

Figure 2:
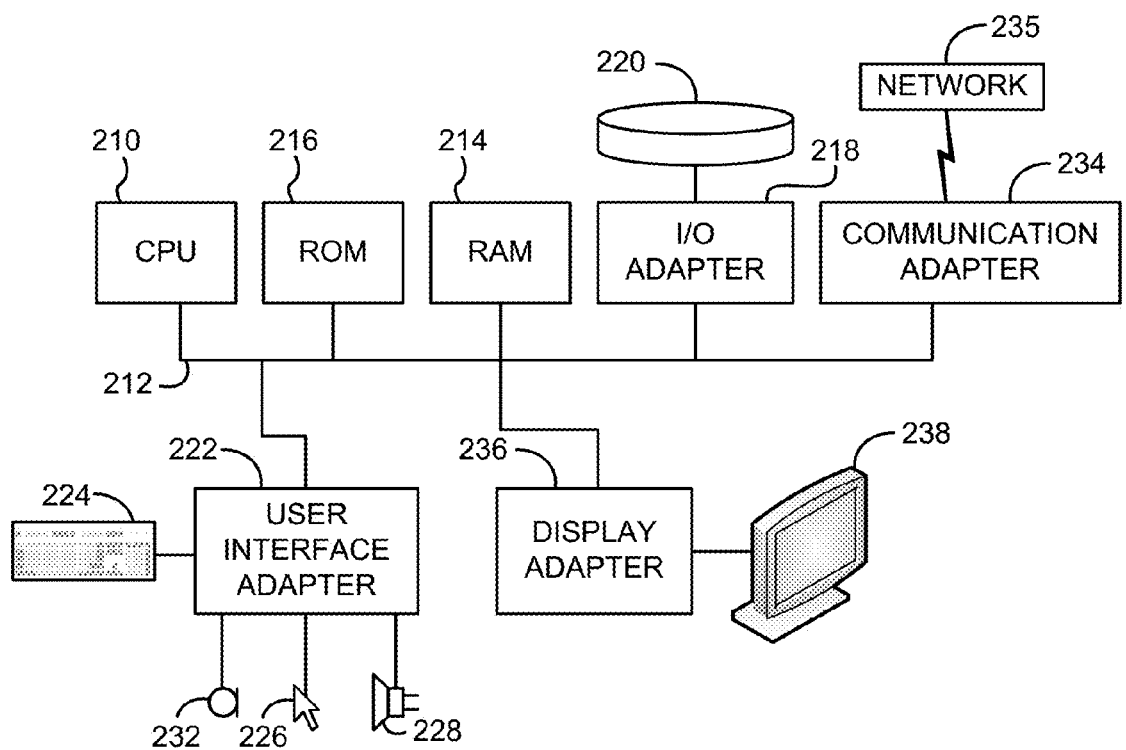
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

The ability to identify who is included on a phone call is a desirable way of determining information pertaining to those individuals participating in the call. However, as the number of individuals participating on a given phone call increases, it becomes harder to identify and distinguish between call participants. For example, existing products are unable to identify who is speaking or even included on a teleconference for a meeting, seminar, etc. having multiple participants at a given location, particularly when using the same teleconference interface. Similar issues are apparent for call locations, such as phone service centers, which receive calls from numerous different people.

Existing solutions to such issues include call participants asking for the identification of other call participants and their personal information for context. However, this is inefficient as it requires time that would otherwise be spent conducting the call and interrupts the flow of discussion.

Other attempts to overcome these issues used audio level outputs to determine which microphone connected to a call corresponds to the voice currently being heard. However, such attempts are still unable to distinguish between different people using the same interface. Accordingly, call participants must still revert to specifically asking for the identification of other call participants and their personal information for context.

In sharp contrast, various embodiments described herein are able to identify phone call participants based on voice signals obtained from the call. Thus, individuals may be identified based on the sound of their voice, e.g., regardless of whether they are in a room shared by other call participants, calling from an unknown number, etc., as will be described in further detail below.

To identify phone call participants, voice signals obtained from a call may be compared against a database, preferably such that an identity associated with the voice signal source may be determined. It should be noted that as used herein, "voice signal" is intended to describe an electrical signal and/or data which represent(s) the sound of a person's voice, as would be appreciated by one skilled in the art upon reading the present description. Thus, it may be desirable to create a database of speaker profiles corresponding to voice signals which may potentially be included in future calls, e.g., for the detection and identification thereof.

Figure 3:
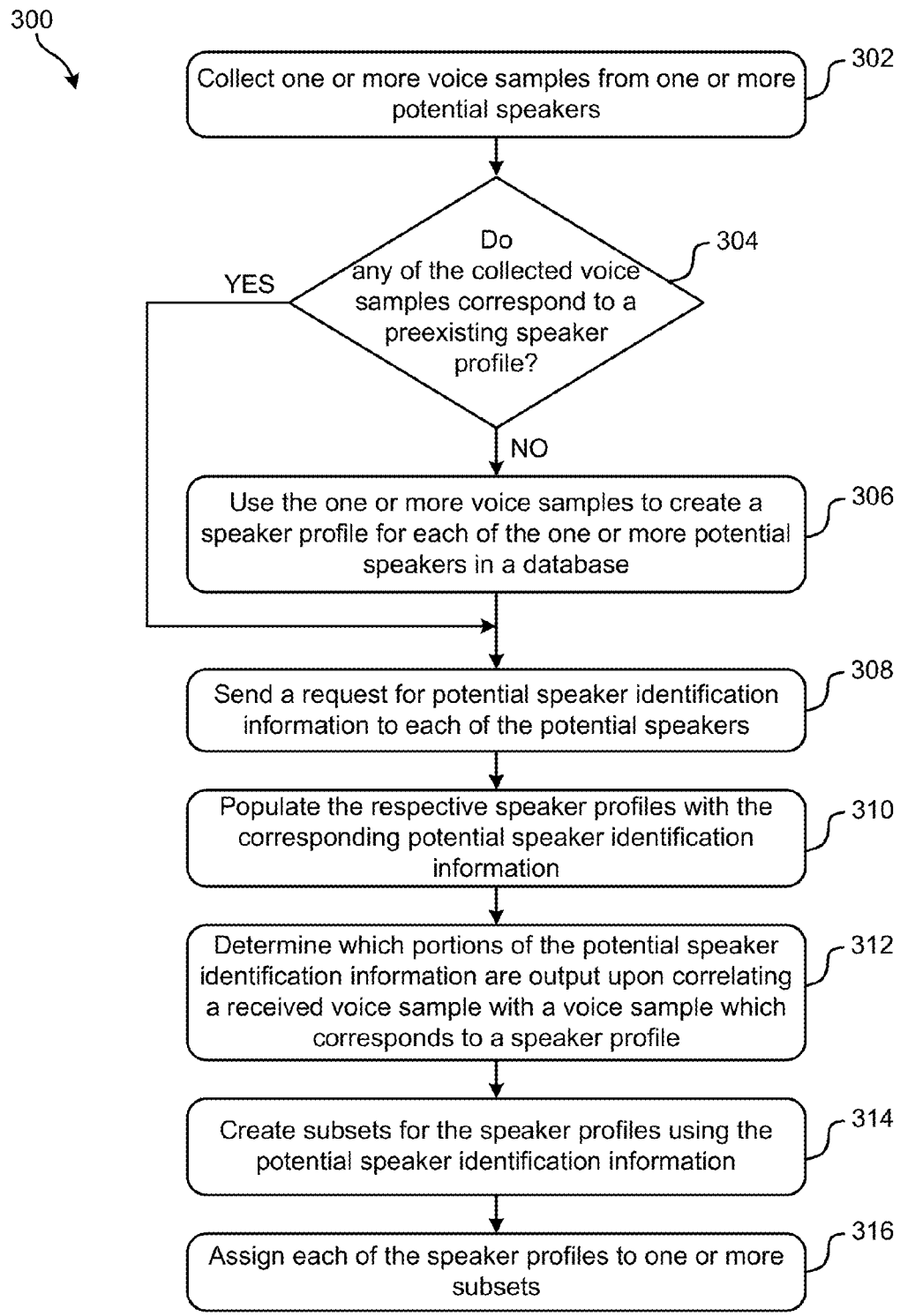
FIG. 3 is a flowchart of a method, in accordance with one embodiment.

Referring to FIG. 3, a flowchart of a method 300 is shown according to one embodiment. The method 300 may be performed in accordance with the present invention in any of the environments depicted in FIGS. 1-2, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit, an application specific integrated circuit (ASIC), a field programmable gate array (FPGA), etc., combinations thereof, or any other suitable computing device known in the art.

As shown in FIG. 3, operation 302 of method 300 includes collecting one or more voice samples from one or more potential speakers. Referring to the present description, "potential speakers" may include anyone who may possibly speak during a future phone call. For example, all members of a given company may be considered "potential speakers" who may use the company's interoffice teleconference system. According to another example, customers for a given company who may call into the company's call center may be considered "potential speakers". In yet another example, individuals included on an upcoming teleconference invite list may be considered "potential speakers". It follows that any number and/or combination of individuals may be considered potential speakers, e.g., depending on the embodiment. However, the number of potential speaker voice samples collected for a given embodiment may depend on an amount of available memory, the likelihood that a potential speaker will actually participate in a future call, an amount of processing associated therewith, etc.

Voice samples may be collected by recording an audio signal received while a potential user is speaking over a phone line. For example, a request to call a certain phone number may be sent to a potential speaker, e.g., via email, memorandum, etc. Upon placing a call in response to the request, the potential speaker may be asked to provide an audio signal by speaking into the microphone of the phone's receiver. Depending on the approach, the audio signal may be provided by projecting a vocal response to a series of questions, repeating a series of phrases provided to the potential speaker over the phone call, reading a series of phrases provided to the potential speaker in the initial email request, etc. However, according to another example, a potential speaker may record an audio signal in response to receiving a request for a voice sample, e.g., via email, and upload the audio signal recording to a server, to a company database, etc. In a further approach, a speaker may provide a voice sample as part of a login procedure for a teleconference. Upon being gathered, the potential speaker's audio signal recording may be used to create a voice sample for a speaker profile, as will soon become apparent.

Referring still to FIG. 3, decision 304 includes determining whether any of the collected voice samples correspond to a preexisting speaker profile. When a collected voice sample does correspond to a preexisting speaker profile, method 300 may proceed to operation 308 below. Alternatively, method 300 proceeds to operation 306 in response to determining that a collected voice sample does not correspond to a preexisting speaker profile.

Operation 306 includes using the one or more voice samples (which do not correspond to a preexisting speaker profile) to create a speaker profile for each of the one or more potential speakers in a database. Accordingly, a speaker profile may be created in a database upon determining that the voice sample does not already correspond to an existing speaker profile in the database (e.g., see decision 408 of FIG. 4 below). However, in other approaches, a speaker profile may be created in a database simply upon receiving the voice sample, e.g., the database is empty, it has previously been determined that the voice sample does not correspond to an existing speaker profile, the potential speaker has indicated that they do not already have a speaker profile in the database, etc. Thus, decision 304 above may not necessarily be performed in some instances.

Moreover, according to various approaches, operation 306 may include creating speaker profiles using any known method which would be apparent to one skilled in the art upon reading the present description.

Referring still to method 300, operation 308 includes sending a request for potential speaker identification information to each of the potential speakers. Moreover, operation 310 includes receiving potential speaker identification information from the potential speakers, while operation 310 includes populating the respective speaker profiles with the corresponding potential speaker identification information.

By storing information pertaining to the potential speaker in the corresponding speaker profiles, that information may be accessed and/or output at a future point in time. Thus, information pertaining to a potential speaker may be output in response to determining that the potential speaker is actually speaking, e.g., in a teleconference. For example, a name, company position, job title, picture, email address, etc. associated with someone currently speaking in a teleconference may be output to one or more devices at some or all physical locations participating on the teleconference, e.g., for presentation on a display screen (e.g., see display device 238 of FIG. 2) and/or projected using an audio output (e.g., see speaker 228 of FIG. 2) at each of the physical locations, as will be described in further detail below. In another example, a customer call received at a company support service center may prompt the customer's transaction history with the company, identification information, a delivery location, etc. to be displayed to a representative at the support service center.

Depending on the amount of potential speaker information stored in a given speaker profile, a determination may be made as to how much of the information is presented in a given situation. For example, all available speaker information may be displayed (output) to an administrator performing updates to the speaker profiles in a database, while a refined amount of speaker information may be displayed on (output to) a display screen while the corresponding individual is speaking, e.g., on a conference call. Such output schemes may prevent having too much, or too little, information available, depending on the approach. Accordingly, optional operation 312 includes determining which portions of the potential speaker identification information are output upon correlating a received voice sample with a voice sample which corresponds to a speaker profile. Again, the amount of information output may depend on the given embodiment, so operation 312 may determine which portions of the potential speaker identification information are output for multiple different instances, e.g., during a teleconference, during database maintenance, when repopulating and/or adding to a speaker profile, etc.

As mentioned above, voice signals obtained may be compared against speaker profiles of a database to identify phone call participants, e.g., preferably such that an identity associated with the voice signal source may be determined. However, a database may include a large number of speaker profiles. Thus, overall efficiency may be improved by reducing the number of speaker profiles in a database that are compared against a received voice sample.

Accordingly, operation 314 further includes creating subsets for the speaker profiles using the potential speaker identification information, while operation 316 includes assigning each of the speaker profiles to one or more subsets, as shown in FIG. 3. Correlating a received voice signal with an entire database may take an undesirably large amount of time, e.g., based on the size of the database (e.g., worldwide vs. a single site), an amount of available computing power, bandwidth, a number of correlation requests, etc. Thus, by creating subsets of speaker profiles, a given voice sample may be correlated against less than all of the database.

Subsets of speaker profiles in a database identify unique sets of profiles, and may be determined based on a number of different parameters. According to different approaches, subsets for the speaker profiles may be created based on time zones associated with each of the received voice samples, geographical location information associated with each of the received voice samples, caller identification, a meeting (teleconference) invite list, a meeting topic, company employee pools, customer lists, etc., and/or combinations thereof.

Moreover, subsets of voice samples may be used when trying to identify received voice signals, e.g., during a teleconference. For instance, a received voice signal may be compared against the speaker profiles of a subset which corresponds to a same geographical location as a physical location from which the voice signal has been received. Moreover, it is preferred that a subset is less than all speaker profiles in the database.

According to an example, which is in no way intended to limit the invention, a voice signal may be received in the United States from a physical location in China during a teleconference. Rather than comparing the voice signal received from China against speaker profiles corresponding to geographical locations in the United States, or Europe, or South America, etc., the voice signal is compared against the subset of speaker profiles specifically corresponding to geographical locations in China. By doing so, a correlation may desirably be made between the voice signal and a corresponding speaker profile (e.g., see operation 406 of FIG. 4 below) while reducing the amount of processing, decreasing the amount of delay time, etc. associated with doing so.

According to another example, a voice signal may be received in the United States from an unknown location during a teleconference at 1:00 PM in the Central Time Zone. It may be desirable to filter out speaker profiles which correspond to physical locations in China such that they are not included in the first comparison attempt, as it would comparatively be 2:00 AM in China. Rather, the received voice signal may first be compared against geographic locations corresponding to time zones for which the local time is during the accepted work day.

Moreover, efficacy may further be improved by cross-correlating different combinations of speaker profile subsets. According to another example, which again is in no way intended to limit the invention, a voice signal may be received in Germany from a physical location in China during a teleconference. The received voice signal may be compared against speaker profiles which appear in both the subset specifically corresponding to geographical locations in China, as well as the subset included on an invite list of the teleconference. Accordingly, a correlation may desirably be made between the voice signal and a corresponding speaker profile while further improving the efficiency associated with doing so. Thus, as mentioned above, a speaker profile may be assigned to more than one subset depending on the given embodiment.

In further embodiments, where a search of a subset fails to reveal the identity of the speaker, the search for a matching profile may be expanded to additional subsets, e.g., based on further criteria.

Figure 4:
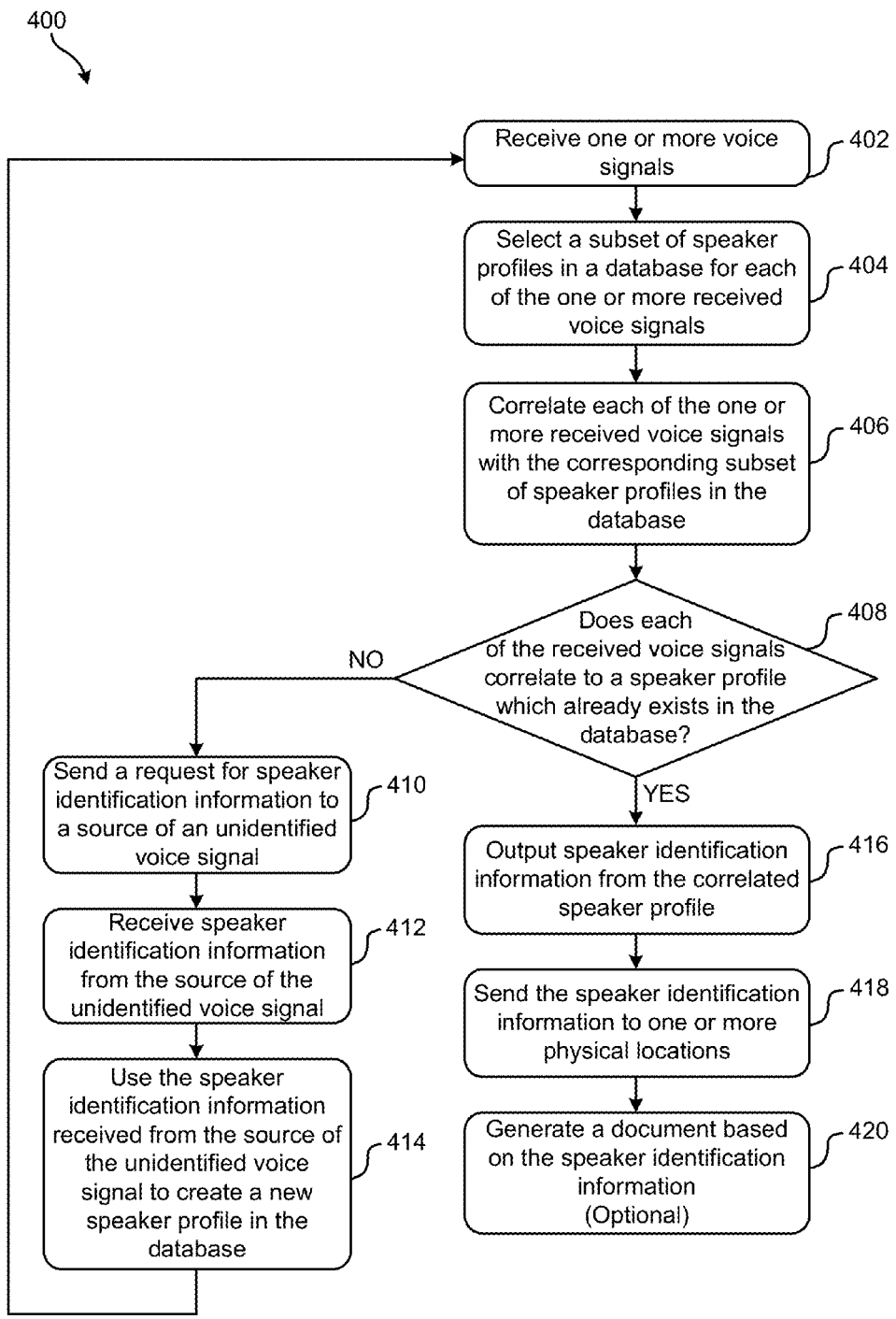
FIG. 4 is a flowchart of a method, in accordance with one embodiment.

As alluded to above, a database may be used to correlate received voice signals with speaker profiles, e.g., during a phone conversation. Referring to FIG. 4, a flowchart of a method 400 for identifying call participants from received voice signals is shown according to one embodiment. The method 400 may be performed in accordance with the present invention in any of the environments depicted in FIGS. 1-2, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit, an application specific integrated circuit (ASIC), a field programmable gate array (FPGA), etc., combinations thereof, or any other suitable computing device known in the art.

Operation 402 of method 400 includes receiving one or more voice signals from one or more participants of a call, e.g., from telephones, computers, etc. at the participants' locations. As described above, voice signals may potentially be received at a given terminal from multiple other physical locations, e.g., while engaged in a group phone call (teleconference). Thus, two or more voice signals may be received from the same or different physical locations. For example, multiple voice signals may be received from multiple people located in the same room using the same phone terminal. However, according to another example, multiple voice signals may be received from multiple people located in different rooms, e.g., each of which are using their own phone terminal. In another example, multiple voice signals may be received from a combination of shared and individual terminals. In yet another example, one or more voice signals may be received from one or more physical locations. For instance, a customer's voice signal may be received from the customer's physical location by a service provider.

With continued reference to FIG. 4, operation 404 includes selecting a subset of speaker profiles in a database for each of the one or more received voice signals, and operation 406 includes correlating each of the one or more received voice signals with the corresponding subset of speaker profiles in the database.

As described above, a database may include a large number of speaker profiles. In such approaches, processing so many profiles may require an undesirably high amount of processing power, runtime, system delay, etc. to attempt to correlate one voice signal with potentially every one of the speaker profiles in the database, let alone two or more voice signals. Moreover, the database may include a plurality of databases, where the databases may be linked in some manner, e.g., accessible by the system performing the voice correlations. For example, country-specific databases of a company may be considered to be parts of a larger "database."

Alternatively, by selecting subsets of speaker profiles to correlate with received voice signals, the amount of processing power, runtime, system delay, etc. to correlate the voice signals with a respective speaker profile may be greatly reduced. It follows that each of the subsets for a given embodiment preferably include less than all the speaker profiles in a corresponding database. Moreover, subsets may be created as speaker profiles are added to the database (e.g., predefined) and/or selected on the fly, e.g., depending on the desired embodiment. According to various approaches, the subsets of speaker profiles may be created and/or selected based on time zones associated with each of the voice signals, geographical location information associated with each of the voice signals, caller identification, a meeting invite list, a meeting topic, company employee pools, customer lists, etc., and/or combinations thereof. Thus, by creating subsets of speaker profiles, a given voice signals may be correlated against less than all of the database. Subsets may be created and/or updated by a system administrator, an end user, etc.

Moreover, speaker profiles may be preloaded in a hierarchy which may determine a priority of searching. For instance, if a correlation with a first subset does not produce a corresponding speaker profile, a subsequent correlation may be performed using a second (e.g., backup) subset of speaker profiles, and so on.

According to an example, which is in no way intended to limit the invention, a voice signal received from a physical location in China during an inter-company teleconference may be first correlated against a subset of personnel listed on the teleconference invite list. If that correlation does not produce a corresponding speaker profile, the voice signal may be correlated against a second subset of company employees stationed in China. If that correlation does not produce a corresponding speaker profile, the voice signal may be correlated against a third subset of all company employees. Following this pattern, in some approaches, all speaker profiles in the database may be correlated against a received voice signal before it is determined that a corresponding speaker profile does not exists in the database.

However, depending on parameters such as the size of a given database, the amount of processing power available, the number of waiting correlation requests, etc., a received voice signal may not be correlated against the entire database before determining that a corresponding speaker profile does not exists in the database. In other words, it may be determined that a received voice signals does not correlate to a speaker profile which already exists in the database without actually inspecting the entire database. According to some approaches, once the probability of finding a speaker profile which corresponds to a received voice signal falls below a certain probability, operation 406 may output that the correlation has resulted in a "failure."

It should also be noted that in some approaches, a subset of speaker profiles may not be selected, e.g., if the database is sufficiently small, when a received voice signal is not recognized, etc. Thus, in some approaches, which are in no way intended to limit the invention, a received voice signal may be correlated with all speaker profiles in the database.

As mentioned above, more than one voice signal may be received from the same physical location. Thus, the correlation performed in operation 406 may include distinguishing between more than one voice signal received from a same physical location. In other words, the correlation performed in operation 406 may be able to distinguish between the voice signals of two or more people speaking through the same phone terminal (e.g., located in the same room) without receiving any additional information from the two or more people. The correlation may be performed using software which employs a matching algorithm according to existing voice recognition algorithms, systems, etc., as would be appreciated by one skilled in the art once having read the present description. Moreover, future voice recognition algorithms, systems, etc. may be combined with the teachings herein to form additional embodiments.

A voice signal may be received from an unknown location. According to an example, a voice signal may be received in the United States from an unknown location during a teleconference. Thus, the correlation performed in operation 406 may implement other information to determine a hierarchy of speaker profiles to correlate against the received voice signal. Following the example above, the voice signal may be received from the unknown location at 1:00 PM in the Central Time Zone. Thus, the correlation may filter out speaker profiles based on time zones corresponding to physical locations in which they are located. For instance, speaker profiles corresponding to geographical locations in China may selectively be excluded from the correlation against the received voice signal during a first attempt, as it would comparatively be 2:00 AM in China. Rather, the received voice signal may first be compared against geographic locations corresponding to time zones for which the local time is during the accepted work day.

Referring still to FIG. 4, the correlation performed in operation 406 may be performed by a voice recognition module. In some approaches, the voice recognition module may be integrated with a controller, computer, processor (e.g., see central processing unit 210 of FIG. 2), etc., e.g., in the circuitry thereof, where the controller, computer, processor, etc. are coupled to the database. In other approaches, the voice recognition module may be implemented separate from, and coupled to a controller, computer, processor, etc. In such approaches, the controller, computer, processor, etc. may be coupled to the database, or the voice recognition module itself may alternatively be coupled to the database.

Moving to decision 408, method 400 determines whether each of the received voice signals correlates to a speaker profile which already exists in the database. Thus, decision 408 is preferably performed for each of the one or more voice signals received in operation 402 above.

Although speaker profiles corresponding to potential speakers may be created prior to conducting a phone call, unidentified speakers may also be included in the call. For example, someone who was not included on the meeting invite list may join in on the call, e.g., to discuss a particular topic. Thus, some embodiments may be faced with unidentified call participants during an ongoing phone call.

Thus, in response to determining that a received voice signal does not correlate to a speaker profile already in the database (e.g., a "failure" as described above with reference to the correlation performed in operation 406), method 400 proceeds to operation 410 which includes sending a request for speaker identification information to a source of an unidentified voice signal.

According to different approaches, the aforementioned request may be sent to the source locations of unidentified voice signals differently. In some approaches, the request may be sent to the source location corresponding to an unidentified voice signal and displayed on a display screen. Proceeding to operation 412, method 400 includes receiving speaker identification information from the source of the unidentified voice signal. For example, in response to the request of operation 410, the individual corresponding to the unidentified voice signal may speak his or her name at a prompt, send an email to an email address provided in the request, upload a document containing the requested speaker identification information to the database, etc.

In other approaches, the request may be sent to a supplemental database, e.g., which corresponds to the source location of the unidentified voice signal. There the unidentified voice signal and/or information included in the request may be compared to any information stored in the supplemental database in an attempt to identify the unidentified voice signal. Moreover, the request may be redirected to the source location in response to not finding the requested speaker identification information in the supplemental database, e.g., so the individual corresponding to the unidentified voice may provide the requested speaker identification information.

The speaker identification information received from the source of the unidentified voice signal may be used to create a new speaker profile in the database. See operation 414. For example, a spoken name may be transcribed to text, and a speaker profile may be created. Moreover, the identification information may be correlated to speaker data, e.g., an entry in an employee database, from which information may be added to the speaker profile.

As a part of creating a new speaker profile in the database, a voice sample may be recorded from the unidentified voice signal, e.g., taken from the ongoing conversation, and stored in the new speaker profile. Thus, the voice sample stored in the new speaker profile may be correlated against voice signals received in the future. Moreover, the new speaker profile may be integrated with other existing databases, e.g., a supplemental database such as a government database, a local database, etc.

In response to performing operation 414, method 400 may then return to operation 402. Once a new speaker profile has been created and populated with speaker identification information and a voice sample, the new speaker profile may then be used in the correlation of subsequently received voice signals. Thus, if a person associated with an unidentified voice signal continues to speak during the teleconference after a new speaker profile is created for them, subsequently received voice signals from them will be successfully correlated to the new speaker profile, thereby resulting in decision 408 determining that the received voice signal does correlate to a speaker profile now in the database. Accordingly, the present embodiment may adapt to a changing number of group members on a teleconference, regardless of whether added group members have a preexisting speaker profile stored in a database.

Looking again to decision 408, method 400 proceeds to operation 416 in response to determining that a received voice signal does correlate to a speaker profile already in the database. Looking to FIG. 4, operation 416 includes outputting speaker identification information from the correlated speaker profile. Moreover, operation 418 includes sending the speaker identification information to one or more participants of the call, e.g., to devices at one or more physical locations.

As described above, some of the embodiments described herein are desirably able to identify teleconference participants based on voice signals obtained from the teleconference call, e.g., regardless of whether they are in a room shared by other call participants, calling from an unknown number, etc. Thus, once the identity of a teleconference participant has been determined from voice signals obtained from the teleconference, it is preferred that personal identification information pertaining to that teleconference participant be made available to other teleconference participants. For example, the speaker identification information may be output from the database to a controller which then determines which physical location(s) to send the speaker identification information to.

According to one approach, the speaker identification information may be sent to devices at two or more physical locations, e.g., depending on the number of teleconference participants. A teleconference may include a minimum of two participants located at two different physical locations. However, in other approaches a teleconference may include multiple participants located at multiple physical locations. It follows that the speaker identification information corresponding to the voice signal received in operation 402 is sent to each of the at least two physical locations, such that it is made available to each of the teleconference participants, e.g., including the physical location at which the speaker, corresponding to the voice signal, is located.

Moreover, it may be desirable that the speaker identification information is to be sent to two or more physical locations while the speaker who corresponds to the speaker identification information is creating a voice signal. In other words, it may be preferred that the speaker identification information is presented while the speaker corresponding thereto is actually talking. For example, a photo, name and company position of a person may be displayed on a screen while that person is talking, e.g., such that other call participants are able to identify who is talking in real time as the conversation progresses.

At the different physical locations, the speaker identification information may be displayed in a number of different ways, depending on the approach. As described above, in some approaches, the speaker identification information may be presented on a display screen (e.g., see display device 238 of FIG. 2) and/or projected using an audio output (e.g., see speaker 228 of FIG. 2) automatically. In other approaches, the teleconference participants at the different physical locations may be presented with an option to request that the speaker identification information is presented on a display screen, through the speaker, etc. by selecting an option, dialing a specific code, typing a request in a text field, etc.

In some instances, it may be desirable that information pertaining to a teleconference is distributed to the members of the teleconference and/or other personnel, e.g., as a reminder, for record keeping purposes, to summarize information pertaining to the teleconference and/or its participants, etc. Accordingly, method 400 additionally includes optional operation 420, where a document is generated, e.g., based on the speaker identification information. According to some approaches, the document may include a name of each speaker identified by the correlating of operation 406. In further approaches, the document may include the speaker information received in operation 412.

According to an example, which is in no way intended to limit the invention, a text file may be created during, or after a teleconference, e.g., by a controller. The text file may include the names, job titles, contact information, etc. of all identified participants of the teleconference; the date of the teleconference; any notes taken during the teleconference, e.g., by an amanuensis; responsibilities assigned during the teleconference; etc. Moreover, the text file may be attached to, or integrated with an email which may be sent to the meeting participants, personnel in management, a database, e.g., for storage, etc., depending on the desired embodiment.

In another example, an email group including all identified teleconference participants and/or teleconference invite list members may be created and made available to the identified teleconference participants and/or other personnel. Accordingly, the email group may be used to distribute documents to all, or a subset of, relevant recipients. Similarly, an email addressed to all identified teleconference participants and/or teleconference invite list members may be pre-generated and updated as the teleconference progresses.

In yet another example, customer calls received at a company support service center may prefill an order form with customer information such as a delivery location, product number, etc. Thus, a customer's voice signal may be received e.g., at a voice recognition module at the support service center, and identified. Moreover, the customer's voice signal may be correlated with speaker profiles in a database, or a selected subset thereof according to any of the approaches described herein. Speaker identification information from a speaker profile correlated to the customer's voice signal is preferably output and sent (e.g., made available to) to the support center individual at the support center individual's physical location. However, in some exemplary approaches, which are in no way intended to limit the invention, the support center individual's voice signal may similarly be correlated with speaker profiles in a database (or a selected subset thereof), and speaker identification information from a speaker profile correlated to the support center individual's voice signal may be output and sent (e.g., made available to) to the customer at the customer's physical location, e.g., for record keeping purposes, reference, convenience of referring to the support center individual by name, etc.

Speaker profiles may also be updated over time as additional information is gathered. For example, some of the embodiments described herein may be able to recognize speaking patterns associated with certain individuals which may be implemented in the speaker profiles associated with those individuals, e.g., thereby enabling improved efficiency in subsequent correlation operations. Moreover, as additional information such as new location information, job titles, security clearances, etc. is acquired over time, it may be compared with information currently stored in speaker profiles and updated accordingly.

A statement may be output that portions of the conversation may be recorded, e.g., to collect voice samples, in some embodiments, e.g., due to privacy concerns and/or to comply with local regulations. Moreover, some embodiments may perform the correlating operations herein without maintaining a recording of a conversation longer than is approximately necessary to perform the correlation. For example, once a voice sample is matched to the profile, the sample may be discarded.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer program product comprising a computer readable storage medium having program instructions embodied therewith, the program instructions being executable by a computer to cause the computer to:
   receive one or more voice signals from one or more participants of a telephonic call;
   correlate each of the one or more received voice signals with speaker profiles in a database;
   output speaker identification information from the correlated speaker profiles;
   send the speaker identification information to at least one of the participants of the call; and
   discard the received one or more voice signals in response to the speaker identification information from each of the correlated speaker profiles being output,
   wherein the speaker identification information is sent to the one or more physical locations while the speaker is creating a voice signal
   wherein the speaker identification information is sent for output in a mode selected from a group consisting of: visually presented on a display screen at each of one or more physical locations and audibly projected by an electrical speaker at each of the one or more physical locations, wherein the mode is selected based on a selection received from each of the one or more physical locations.

2. The computer program product of claim 1, wherein the program instructions are executable by the computer to cause the computer to:
   generate a document in response to the call ending, the document being based on the speaker identification information, wherein the document includes a name of each speaker identified by the correlating; and
   send the document to each of the speakers identified by the correlating,
   wherein the document is sent to each of the speakers via email,
   wherein the correlating includes distinguishing between more than one voice signal received from a same physical location.

3. The computer program product of claim 1, wherein the program instructions are executable by the computer to cause the computer to:
   send a request for speaker identification information to a supplemental database corresponding to a source of an unidentified voice signal;
   redirect the request for speaker identification information to a source location of the unidentified voice signal in response to the request failing to produce speaker identification information from the supplemental database;
   receive speaker identification information from the source of the unidentified voice signal;
   use the speaker identification information received from the source of the unidentified voice signal to create a new speaker profile in the database; and
   integrate the new speaker profile with the supplemental database.

4. The computer program product of claim 3, wherein the program instructions are executable by the computer to cause the computer to:
   record a voice sample from the unidentified voice signal;
   add the recorded voice sample to the new speaker profile; and
   use the new speaker profile to correlate subsequently received voice signals.

5. The computer program product of claim 1, wherein the program instructions are executable by the computer to cause the computer to:
   collect one or more voice samples from one or more speakers;
   use the one or more voice samples to create a speaker profile for each of the one or more speakers in the database;
   populate the speaker profiles with speaker identification information corresponding to each of the one or more speakers; and collect one or more voice samples from one or more potential speakers, wherein collecting the one or more voice samples from the one or more potential speakers includes:
- sending a second request to each of the one or more potential speakers, the second request being to call a specified phone number,
- receiving a phone call at the specified phone number from at least one of the one or more potential speakers in response to the second request sent to each of the one or more potential speakers,
- establishing a telephonic connection with the at least one of the one or more potential speakers in response to receiving the phone call,
- sending a third request to the at least one of the one or more potential speakers via the telephonic connection, the third request being to provide an audio signal by speaking into a microphone of a phone receiver,
- receiving the audio signal from the at least one of the one or more potential speakers via the telephonic connection in response to sending the third request, and
- using the at least one received audio signal to create at least one of the voice samples, wherein the third request is for prompting the at least one of the one or more potential speakers to perform at least one action selected from a group consisting of: provide a vocal response to a series of predetermined questions included in the third request, repeat a series of phrases included in the third request, and read a series of phrases included in the second request.

6. A computer program product comprising a computer readable storage medium having program instructions embodied therewith, the program instructions executable by a computer to cause the computer to:
- receive at least two voice signals from participants of a telephonic call;
- select a first subset of speaker profiles in a database for each of the received voice signals;
- select a second subset of speaker profiles in the database for each of the received voice signals;
- cross-correlate each of the received voice signals with both of the first and second selected subsets of speaker profiles in the database;
- output speaker identification information from the cross-correlated speaker profiles; and
- send the speaker identification information to participants of the call located at two or more physical locations,
- wherein the speaker identification information is sent to the two or more physical locations while the speaker is creating a voice signal
- wherein the speaker identification information is sent for output in a mode selected from a group consisting of: visually presented on a display screen at each of the two or more physical locations and audibly projected by an electrical speaker at each of the two or more physical locations, wherein the mode is selected based on a selection received from each of the physical locations.

7. The computer program product of claim 6, wherein the first and second subsets of the database are respectively selected based on geographical location information associated with each of the voice signals and a meeting invite list.

8. The computer program product of claim 6, wherein additional subsets of speaker profiles are organized in a hierarchy which determines a correlation priority, wherein the additional subsets of speaker profiles are used according to the correlation priority to perform subsequent correlations with each of the at least two received voice signals in response to determining that the cross-correlation has failed to output speaker identification information for each of the at least two received voice signals.

9. The computer program product of claim 6, wherein the first and second subsets of the database are respectively selected based on time zones associated with each of the voice signals and a meeting invite list.

10. The computer program product of claim 6, wherein the program instructions are executable by the computer to cause the computer to: discard the at least two received voice signals from the participants of the call in response to the speaker identification information from each of the cross-correlated speaker profiles being output.

11. The computer program product of claim 6, wherein the program instructions are executable by the computer to cause the computer to:
- send, by the computer, a request for speaker identification information to a supplemental database corresponding to a source of an unidentified voice signal;
- redirect, by the computer, the request for speaker identification information to a source location of the unidentified voice signal in response to the request failing to produce speaker identification information from the supplemental database;
- receive, by the computer, speaker identification information from the source of the unidentified voice signal;
- use, by the computer, the speaker identification information received from the source of the unidentified voice signal to create a new speaker profile in the database; and
- integrate, by the computer, the new speaker profile with the supplemental database.

12. The computer program product of claim 11, wherein the program instructions are executable by the computer to cause the computer to:
- record, by the computer, a voice sample from the unidentified voice signal;
- add, by the computer, the recorded voice sample to the new speaker profile; and
- use, by the computer, the new speaker profile to correlate subsequently received voice signals.

13. The computer program product of claim 6, wherein the program instructions are executable by the computer to cause the computer to:
- collect, by the computer, one or more voice samples from one or more potential speakers;
- use, by the computer, the one or more voice samples to create a speaker profile for each of the one or more potential speakers in the database; and
- populate, by the computer, the speaker profiles with potential speaker identification information corresponding to each of the one or more potential speakers,
- wherein collecting the one or more voice samples from the one or more potential speakers includes:
  - sending a second request to each of the one or more potential speakers, the second request being to call a specified phone number,
  - receiving a phone call at the specified phone number from at least one of the one or more potential speakers in response to the second request sent to each of the one or more potential speakers,
  - establishing a telephonic connection with the at least one of the one or more potential speakers in response to receiving the phone call, sending a third request to the at least one of the one or more potential speakers via the telephonic connection, the third request being to provide an audio signal by speaking into a microphone of a phone receiver, receiving the audio signal from the at least one of the one or more potential speakers via the telephonic connection in response to sending the third request, and using the at least one received audio signal to create at least one of the voice samples, wherein the third request is for prompting the at least one of the one or more potential speakers to perform at least one action selected from a group consisting of: provide a vocal response to a series of predetermined questions included in the third request, repeat a series of phrases included in the third request, and read a series of phrases included in the second request.

14. A computer program product comprising a computer readable storage medium having program instructions embodied therewith, the program instructions being executable by a computer to cause the computer to:

receive one or more voice signals from one or more participants of a telephonic call;

correlate each of the one or more received voice signals with speaker profiles in a database;

output speaker identification information from the correlated speaker profiles;

send the speaker identification information to at least one of the participants of the call;

discard the received one or more voice signals in response to the speaker identification information from each of the correlated speaker profiles being output;

send a request for speaker identification information to a supplemental database corresponding to a source of an unidentified voice signal;

redirect the request for speaker identification information to a source location of the unidentified voice signal in response to the request failing to produce speaker identification information from the supplemental database;

receive speaker identification information from the source of the unidentified voice signal;

use the speaker identification information received from the source of the unidentified voice signal to create a new speaker profile in the database; and integrate the new speaker profile with the supplemental database.

15. A computer program product comprising a computer readable storage medium having program instructions embodied therewith, the program instructions executable by a computer to cause the computer to:

receive at least two voice signals from participants of a telephonic call;

select a first subset of speaker profiles in a database for each of the received voice signals;

select a second subset of speaker profiles in the database for each of the received voice signals;

cross-correlate each of the received voice signals with both of the first and second selected subsets of speaker profiles in the database;

output speaker identification information from the cross-correlated speaker profiles; and send the speaker identification information to participants of the call located at two or more physical locations, wherein additional subsets of speaker profiles are organized in a hierarchy which determines a correlation priority, wherein the additional subsets of speaker profiles are used according to the correlation priority to perform subsequent correlations with each of the at least two received voice signals in response to determining that the cross-correlation has failed to output speaker identification information for each of the at least two received voice signals.

16. A computer program product comprising a computer readable storage medium having program instructions embodied therewith, the program instructions executable by a computer to cause the computer to:

receive at least two voice signals from participants of a telephonic call;

select a first subset of speaker profiles in a database for each of the received voice signals;

select a second subset of speaker profiles in the database for each of the received voice signals;

cross-correlate each of the received voice signals with both of the first and second selected subsets of speaker profiles in the database;

output speaker identification information from the cross-correlated speaker profiles; and send the speaker identification information to participants of the call located at two or more physical locations;

send, by the computer, a request for speaker identification information to a supplemental database corresponding to a source of an unidentified voice signal;

redirect, by the computer, the request for speaker identification information to a source location of the unidentified voice signal in response to the request failing to produce speaker identification information from the supplemental database;

receive, by the computer, speaker identification information from the source of the unidentified voice signal;

use, by the computer, the speaker identification information received from the source of the unidentified voice signal to create a new speaker profile in the database; and integrate, by the computer, the new speaker profile with the supplemental database.

17. A method, comprising:

receiving one or more voice signals from one or more participants of a telephonic call;

correlating each of the one or more received voice signals with speaker profiles in a database;

outputting speaker identification information from the correlated speaker profiles;

sending the speaker identification information to at least one of the participants of the call; and discarding the received one or more voice signals in response to the speaker identification information from each of the correlated speaker profiles being output, wherein the speaker identification information is sent to the one or more physical locations while the speaker is creating a voice signal wherein the speaker identification information is sent for output in a mode selected from a group consisting of: visually presented on a display screen at each of one or more physical locations and audibly projected by an electrical speaker at each of the one or more physical locations, wherein the mode is selected based on a selection received from each of the one or more physical locations.

* * * * *